United States Patent [19]

Schwartz

[11] 4,121,642

[45] Oct. 24, 1978

[54] PNEUMATIC TIRE

[75] Inventor: Harold Gordon Schwartz, Akron, Ohio

[73] Assignee: E. I. Du Pont de Nemours and Company, Wilmington, Del.

[21] Appl. No.: 774,434

[22] Filed: Mar. 4, 1977

[51] Int. Cl.² .............................................. B60C 9/14
[52] U.S. Cl. ............................ 152/354 R; 152/357 A
[58] Field of Search ........... 152/357 A, 357 R, 353 R, 152/352, 354, 359, 353 C, 323, 324, 325

[56] References Cited

U.S. PATENT DOCUMENTS

| 3,763,109 | 10/1973 | Witsiepe | 260/75 R |
| 3,766,146 | 10/1973 | Witsiepe | 260/75 R |
| 3,782,440 | 1/1974 | Depmeyer | 152/357 A |
| 3,837,387 | 9/1974 | Menough et al. | 152/361 R |
| 3,850,218 | 11/1974 | Bertelli et al. | 152/353 C |
| 3,860,052 | 1/1975 | Schroeder | 152/354 |
| 3,990,493 | 11/1976 | Caretta | 152/361 R |

FOREIGN PATENT DOCUMENTS 1,191,745  5/1970  United Kingdom ................ 152/353 R

*Primary Examiner*—Albert J. Makay
*Assistant Examiner*—Carl Rowold

[57] ABSTRACT

A pneumatic tire comprising an annular body of an elastomeric material having a central tread portion, a belt under the tread, bead rings connected by sidewalls to the tread, a carcass extending toroidally between bead rings, and an inner liner to contain compressed air, characterized in that said carcass is a one-piece cordless carcass of a thermoplastic copolyetherester elastomer or a polyurethane elastomer having a multiplicity of closely placed slits extending through said carcass from about bead ring to about bead ring, said slits being in a direction approximately perpendicular to the median plane of the tire.

10 Claims, 2 Drawing Figures

F I G. 1
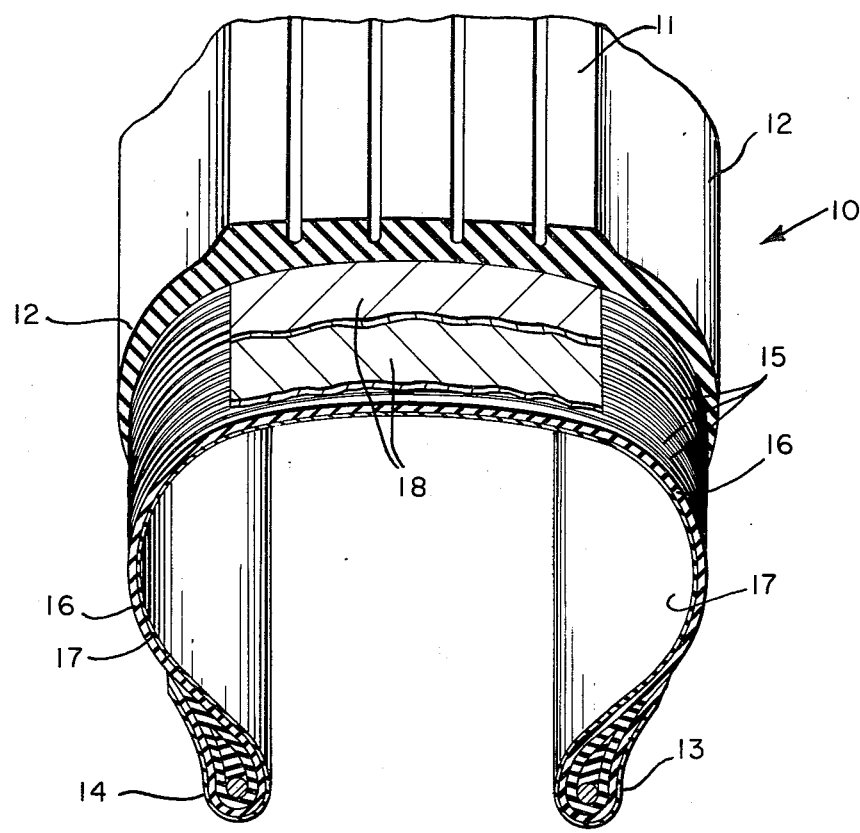
F I G. 2
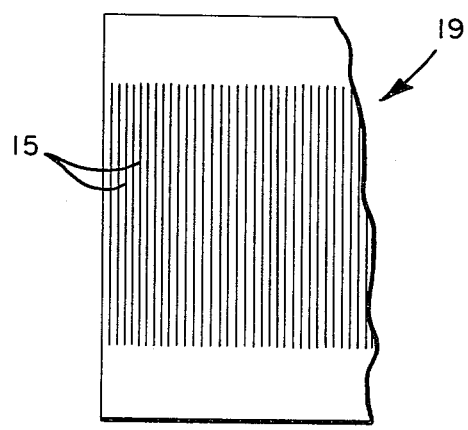

PNEUMATIC TIRE

BACKGROUND OF THE INVENTION

This invention relates to a pneumatic tire having a one-piece cordless thermoplastic elastomeric carcass.

In the construction of radial tires, the plies of the reinforcing fibrous cords extend transversely from bead ring to bead ring. On top of the plies under the tread is an inextensible belt comprised of several layers of cords. The belt cords are low angle, about 10°-30°, and act to restrict the 90° carcass plies. Radial tires are known to have certain advantages over bias-angle tires or bias-belted tires and have good road capabilities and excellent wearing qualities. However, the carcass of radial tires, as mentioned above, contains cords, made of nylon, polyester or rayon that extend transversely from bead ring to bead ring. The cords in the carcass of the tire are an essential feature because they function to, among other things, retain the size and shape, anisotropy and handling response of the tire. However, constructing a carcass having radial cords is an expensive and rather complicated procedure in the manufacture of radial tires. Therefore, it would be advantageous to develop an alternative or modified construction for radial tires not requiring a carcass containing fibrous cords.

SUMMARY OF THE INVENTION

It has now been discovered that a pneumatic tire having a cordless carcass can be made that possesses the advantages of conventional radial tires. More specifically, the pneumatic tire of the present invention comprises an annular body of an elastomeric material having a central tread portion, a belt positioned under the tread, bead rings connected by sidewalls to the tread, a carcass extending toroidally between bead rings, and an inner liner to contain compressed air, characterized in that said carcass is a one-piece cordless carcass of a thermoplastic copolyetherester elastomer or a thermoplastic polyurethane elastomer having a multiplicity of closely placed slits extending through said carcass from about bead ring to about bead ring, said slits being in a direction approximately perpendicular to the median plane of the tire. Preferably, the cordless carcass is formed from an oriented thermoplastic copolyetherester elastomer and the slits are in a direction parallel to the direction of orientation. Usually the tire contains from about 18-24 slits per inch.

DESCRIPTION OF THE DRAWING

FIG. 1 is a fragmentary plan view of the pneumatic tire with portions of the tread and sidewalls removed to show the arrangement of the cordless carcass, and FIG. 2 is a plan view of a portion of a sheet of the cordless carcass material before it is formed into a tire carcass.

DESCRIPTION OF PREFERRED EMBODIMENTS

As shown from FIG. 1 of the drawings, the pneumatic tire 10 is of conventional cross-sectional shape having a tread 11, sidewalls 12 and bead rings 13 and 14. The tire is provided with a cordless carcass 16 that contains a multiplicity of slits 15 that completely cut through the thermoplastic elastomeric carcass and the slits extend from about bead ring 13 to about bead ring 14. It can best be seen from FIG. 2 that slits 15 in the unformed carcass material 19 stop just short of the edge of the carcass material. The uncut portion of carcass material 19, usually between about 2-3 inches from the edges, is wrapped around the bead rings when the tire is made. An inner liner 17 of a thin layer of rubber on the inside of the tire retains compressed air. The tire contains one or more belts 18, preferably made of fiberglass or steel, interposed between cordless carcass 16 and tread 11. The width of belt 18 is approximately the width of tread 11.

The thermoplastic copolyetherester elastomer which can be used to make the one-piece cordless carcass of this invention consists essentially of a multiplicity of recurring interlinear long chain ester units and short chain ester units joined head-to-tail through ester linkages, said long chain ester units being represented by the formula:

and said short chain ester units being represented by the formula:

wherein G is a divalent radical remaining after removal of terminal hydroxyl groups from poly(alkylene oxide) glycols having a molecular weight between about 400-6000, e.g., poly(tetramethylene oxide) glycol; and a carbon-to-oxygen atomic ratio of about 2.0-4.3; R is a divalent radical remaining after removal of carboxyl groups from a dicarboxylic acid having a molecular weight less than about 300, e.g., phthalic, terephthalic or isophthalic acids; and D is a divalent radical remaining after removal of hydroxyl groups from a low molecular weight diol having a molecular weight less than about 250; said short chain ester units constitute about 35-95% by weight of the copolyetherester and said long chain ester units constitute the balance; at least about 70% of the R groups are 1,4-phenylene radicals, at least about 70% of the D groups are 1,4-butylene radicals, and the sum of the percentages of the R groups which are not 1,4-phenylene radicals and the D groups which are not 1,4-butylene radicals does not exceed about 30%.

The term "long chain ester units" as applied to units in the polymer chain refers to the reaction product of the long chain glycol with a dicarboxylic acid. Such "long chain ester units", which are a repeating unit in the copolyetherester, correspond to formula (I) above. The long chain glycols are polymeric glycols having terminal hydroxyl groups and a molecular weight above about 400 and preferably from about 600-3000. Poly(alkylene oxide) glycols used to make the copolyetheresters include poly(ethylene oxide) glycol, poly(1,2- and 1,3-trimethylene oxide) glycol, poly(tetramethylene oxide) glycol, etc.

The term "short chain ester units" as applied to units in a polymer chain refers to low molecular weight compounds where polymer chain units have molecular weights less than about 550. They are made by reacting a low molecular weight diol (below about 250) with a dicarboxylic acid to form ester units represented by formula (II) above. Representative low molecular weight diols include acyclic, alicyclic, and aromatic dihydroxy compounds such as, in addition to the preferred 1,4-butanediol, diols having 2-15 carbon atoms such as ethylene, propylene, trimethylene, and hexamethylene glycols.

Dicarboxylic acids which are reacted with the foregoing long chain glycols and low molecular weight diols to produce the copolyetherester are aliphatic, cycloaliphatic, or aromatic dicarboxylic acids of low molecular weight, i.e., having a molecular weight of less than about 300. Representative dicarboxylic acids include, in addition to the preferred phthalic, isophthalic, and terephthalic acids, or mixtures thereof, sebacic acid, adipic acid, fumaric acid, and bibenzoic acid.

These copolyetheresters are well known in the art and described in detail in U.S. Pat. Nos. 3,766,146, 3,651,014, and 3,763,109.

The preferred thermoplastic copolyetherester elastomer used as a tire carcass can be prepared by an ester interchange reaction of 0.309 mole of dimethyl terephthalate, 0.040 mole of polytetramethylene ether glycol (having a number-average molecular weight of about 975), an excess 1,4-butanediol in the presence of a tetrabutyl titanate/magnesium acetate catalyst and a stabilizer (sym-di-beta-naphthyl-phenylenediamine). The reaction is conducted at atmospheric pressure up to a temperature of 220° C. Polycondensation at 250° C follows for about 90 minutes. The resulting copolyetherester elastomer has an inherent viscosity of about 1.40, measured at a concentration of about 0.1 gram of polymer per dcl in m-cresol. The copolyetherester has a Shore D hardness of about 55.

Thermoplastic polyurethanes useful in making a tire carcass of this invention can be prepared by various known procedures. An eminently suitable product is a liquid isocyanato-terminated polyether having about 6.3 weight percent NCO groups and made by mixing one mole polytetramethyleneoxide glycol (number average molecular weight of 1,000) with two moles 2,4-tolylene diisocyanate for 3-4 hours at 80° C.

One such class of liquid isocyanato-terminated polyurethanes is prepared by heating at a temperature of about 50° to 100° C. a polymeric glycol having a number average molecular weight of at least 750 with a molar excess of an organic diisocyanate to prepare an isocyanate-terminated prepolymer. The molar ratio of diisocyanate to polyol used is about 1.2-4.1 and preferably about 1.2:1-3:1. At the higher molar ratios, there will be some free organic diisocyanate present in the polymer which will subsequently function as a crosslinking agent when the mixture of isocyanato-terminated polymer and active hydrogen-containing organic compound is finally cured by heating under pressure. The presence of free organic diisocyanate in the polymer is desirable when higher molecular weight polymeric glycols are being used since it tends to effect a decrease in the viscosity of the mixture. The molecular weight of the polymeric glycol and the molar ratio of organic diisocyanate to glycol should generally be selected so that the isocyanate-terminated prepolymer is a liquid.

Of the polymeric glycols which are reacted with a molar excess of an organic diisocyanate to prepare the isocyanate-terminated polymer, the poly(alkylene oxide) glycols are preferred. These glycols have the general formula $H(OR)_xOH$, wherein R is an alkylene radical which need not necessarily be the same in each instance and $x$ is an integer so that the number average molecular weight of the glycol is at least 750. They may be prepared by the polymerization of cyclic ethers such as ethylene oxide, propylene oxide, dioxalane or tetrahydrofuran. The preferred polyalkyleneether glycol is a polytetramethyleneoxide presence of a catalyst such as p-toluene sulfonic acid, can also be used.

The polyalkylene-arylene oxide glycols which can also be used are similar to the polyalkyleneether glycols except that some arylene radicals are present. In general, the phenylene and napthylene radicals are preferred with or without substituents such as alkyl or alkylene groups. These polymeric glycols can be conveniently prepared by reacting a cyclic ether, such as ethylene oxide, with an arylene glycol.

The organic diisocyanates used include aromatic, aliphatic and cycloaliphatic types. Toluene-2,4-diisocyanate is preferred. Other representative diisocyanates, such as 4-methyl-1,3-cyclohexane diisocyanate, 4-methoxy-m-phenylene diisocyanate, 4,4'-biphenyl diisocyanate, 4,4'-methylenediphenyl diisocyanate, etc., can be used.

These polyurethanes can be cured by mixing with an active hydrogen-containing organic compound having at least two active hydrogen atoms, allowing the mixture to stand until it becomes a solid capable of being molded. Such materials containing free NCO groups can be finally cured by heat under pressure after they have been molded into the desired form. If the material is essentially free of —NCO groups, post-curing after molding is not necessary. This process of preparing a cured elastomer from a liquid prepolymer composition yields an elastomer having improved properties as compared to polyurethane elastomers prepared by mixing a liquid isocyanato-terminated prepolymer with an active hydrogen-containing organic compound, followed immediately by heating under pressure such as is done in casting operations.

The "one-shot" processes in which the diisocyanate polymeric polyol and curing agent are mixed substantially simultaneously can also be used to prepare polyurethane carcasses by both molding and casting especially when the curing agent is a polyol. Sulfur cured polyurethane elastomers, such as are described in U.S. Pat. No. 2,808,391 can also be used.

The active hydrogen-containing organic compounds are generally diamines or glycols, although compounds containing carboxyl groups can also be used. The term "active hydrogen atoms" refers to hydrogens which, because of their position in the molecule, display activity according to the Zerewitinoff test as described by Kohler in J. Am. Chem. Soc. 49, 3181 (1927). Representative compounds include dichlorobenzidine, 4,4'-methylene-bis (2-chloroaniline), 3,3-dichloro-4,4'-biphenyldiamine, 2,6-diaminopyridine, 4,4'-dihydroxydiphenyl, ethanolamine, aminobenzoic acid, butane-1,4-diol, etc. In addition to the above compounds, other organic compounds containing more than two atoms having active hydrogen can be used, such as trimesic acid, glycerol, triethanolamine, 2,4,6-triaminotoluene, trimethylolpropane, etc. Mixtures of these various active hydrogen-containing organic compounds can be used and water which acts as a chain-extender for isocyanato-terminated polymers can be used in admixture with any of the above described active-hydrogen compounds. The aromatic diamines of reduced activity are preferred, such as 3,3'-dichloro-4,4'-biphenyldiamine.

In general, the amount of organic compund to be used should be not less than an amount which yields at least 60 percent of the total number of active hydrogen atoms theoretically required to react with all of the isocyanato groups. The preferred amount of organic compound to be used is such that the number of active hydrogen atoms present in the compound be about 70-90 percent of the total number of free isocyanato groups present in the isocyanato-terminated polymer. This leaves from about 10-30 percent of the isocyanate groups to act as cross-linking agents when the isocyanate-terminated polymer/active hydrogen-containing organic compound mixture is finally cured by heating under pressure. It is to be understood that greater or lesser amounts of active hydrogen-containing organic compounds can be used and, when diamines are used, the number of groups bearing active hydrogen atoms may approach or even exceed the number of free isocyanato groups in the polymer. When the active hydrogen-containing compound and isocyanate-terminated polymer mixture is allowed to stand, the mixture becomes partially solidified since the organic compound functions as a chain-extending agent and increases the molecular weight of the polymer.

As can be seen from FIG. 2, the tire carcass is formed from a single extruded sheet of thermoplastic elastomer carcass material 19. The carcass material is cut so that it has 18-24 slits per inch and these slits function in the same manner as radical cords. The slits can be cut in the carcass material using a series of knives or a stamp. The tire carcass is formed from a single extruded sheet of thermoplastic material generally about 0.3-0.7 cm thick. In a preferred embodiment the tire carcass is formed from a copolyetherester that is oriented by stretching, heat setting, and cooling by conventional means such as disclosed in the Encyclopedia of Polymer Science and Technology, Vol. 11, pages 50-53, Interscience (1969), "Polyester Films." The copolyetherester sheet is oriented by stretching the sheet by conventional means at least 300% of its original length, and preferably at least 400%, at a temperature below its melting point by at least 11 centigrade degrees. The copolyetherester sheet of carcass material is maintained at that length and brought to or maintained at a heat setting temperature between 83 and 11 centigrade degrees below its melting point. The sheet is then cooled to a temperature below the heat setting temperature by at least 56 centigrade degrees. It is essential that the oriented copolyetherester elastomer carcass material be slit in a direction parallel to the direction of orientation.

Alternatively, an oriented thermoplastic copolyetherester elastomer carcass can be formed from a molded cylinder of the elastomer where the cylinder is stretched in a longitudinal direction or direction parallel to its longitudinal axis for orientation and the cylinder is then slit and placed on the tire-forming drum.

The slit thermoplastic elastomer sheet that constitutes the carcass material is formed into a carcass for the tire in the exact same manner as any carcass material is treated in making conventional radial tires. Briefly, the process for making the tire begins with the application of a thin layer of rubber compound to the drum called the interliner. Next, the carcass material is placed on the drum. This step is followed by setting the beads in place and the uncut edges of the carcass are turned up around the beads. Before the belts are applied, the green tire is expanded from a cylindrical to a toroidal shape. Then the belts are added. Finally, the tread and sidewalls are added to complete the tire. The drum is collapsed and the green, uncured tire is removed. The final green tire has a toroidal shape.

The green tires are loaded into automatic tire presses and heated to a temperature sufficient to vulcanize the tread, sidewalls and inner liner of the tire, e.g., about 135°-195° C. When the carcass is an oriented copolyetherester elastomer, the tire can be cooled in the press to 56 centigrade degrees below the heat setting temperature or about 79°-139° C. to insure against loss of orientation.

I claim:

1. A pneumatic tire comprising an annular body of an elastomeric material having a central tread portion, a belt positioned under the tread, and bead rings connected by sidewalls to the tread, a carcass extending toroidally between bead rings, and an inner liner disposed within the carcass to contain compressed air, characterized in that said carcass is a one-piece cordless carcass of a thermoplastic elastomer having a multiplicity of closely placed slits that completely cut through said carcass and extend from about bead ring to about bead ring, said slits being in a direction approximately perpendicular to the median plane of the tire.

2. A tire of claim 1 wherein the cordless carcass has about 18-24 slits per inch.

3. A tire of claim 1 wherein the thermoplastic elastomer is copolyetherester that is oriented, said slits are in a direction parallel to the direction of orientation, and said elastomer consists essentially of a multiplicity of recurring long chain ester units and short chain ester units joined head-to-tail through ester linkages, said long chain ester units being represented by the formula:

and said short chain ester units being represented by the formula:

where G is a divalent radical remaining after the removal of terminal hydroxyl groups from poly(alkylene oxide) glycols having a molecular weight between about 400-6000 and a carbon-to-oxygen atomic ratio of about 2.0-4.3; R is a divalent radical remaining after removal carboxyl groups from a dicarboxylic acid having a molecular weight less than about 300; and D is a divalent radical remaining after removal of hydroxyl groups from a low molecular weight diol having a molecular weight less than about 250; said short chain ester units constitute about 35-95% by weight of the copolyetherester, and said long chain ester units constitute the balance; at least about 70% of the R groups are 1,4-phenylene radicals, at least about 70% of the D groups are 1,4-butylene radicals and the sum of the percentages of R groups which are not 1,4-phenylene radicals and the D groups which are not 1,4-butylene radicals does not exceed about 30%.

4. A tire of claim 3 wherein the dicarboxylic acid used to make the copolyetherester carcass is terephthalic acid.

5. A tire of claim 3 wherein the low molecular weight diol used to make the copolyetherester carcass is 1,4-butanediol.

6. A tire of claim 3 wherein the poly(alkylene oxide) glycol used to make the copolyetherester carcass is poly(tetramethylene oxide) glycol.

7. A tire of claim 3 wherein the cordless carcass has about 18–24 slits per inch.

8. A tire of claim 1 wherein the thermoplastic elastomeric carcass is polyurethane.

9. A tire of claim 1 wherein the thermoplastic elastomeric carcass is a copolyetherester.

10. A tire of claim 1 wherein the thermoplastic elastomeric carcass is an oriented copolyetherester and said slits are in a direction parallel to the direction of orientation.

* * * * *